United States Patent
Cheng

(10) Patent No.: US 10,643,302 B2
(45) Date of Patent: May 5, 2020

(54) METHOD AND APPARATUS FOR GENERATING THREE-DIMENSIONAL PANORAMIC VIDEO

(71) Applicant: VIA Technologies, Inc., New Taipei (TW)

(72) Inventor: Robin J. Cheng, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 19 days.

(21) Appl. No.: 16/006,874

(22) Filed: Jun. 13, 2018

(65) Prior Publication Data

US 2019/0057487 A1   Feb. 21, 2019

Related U.S. Application Data

(60) Provisional application No. 62/546,137, filed on Aug. 16, 2017.

(30) Foreign Application Priority Data

Jan. 4, 2018   (TW) .............................. 107100258 A

(51) Int. Cl.
  *G06T 3/00*   (2006.01)
  *H04N 5/232*   (2006.01)
  (Continued)

(52) U.S. Cl.
  CPC ....... *G06T 3/0087* (2013.01); *H04N 5/23238* (2013.01); *H04N 13/106* (2018.05);
  (Continued)

(58) Field of Classification Search
  CPC ........... G06T 3/0087; G06T 3/20; G06T 3/60; H04N 5/23238; H04N 13/106; H04N 13/161; H04N 2013/0081
  See application file for complete search history.

(56) References Cited

U.S. PATENT DOCUMENTS

| 5,983,251 A * | 11/1999 | Martens ............... H04N 19/186 |
| | | 375/E7.083 |
| 2003/0020708 A1 | 1/2003 | Redert |

(Continued)

FOREIGN PATENT DOCUMENTS

| CN | 1153362 | 7/1997 |
| CN | 103544725 | 1/2014 |

(Continued)

OTHER PUBLICATIONS

"Office Action of Taiwan Counterpart Application," dated Sep. 7, 2018, pp. 1-7.

*Primary Examiner* — Dave Czekaj
*Assistant Examiner* — Berteau Joisil
(74) *Attorney, Agent, or Firm* — JCIPRNET

(57) ABSTRACT

A method and an apparatus for generating 3D panoramic video are provided. In the method, plural frames are captured from a panoramic video. Each frame is transformed into a polyhedral mapping projection comprising side planes, a top plane and a bottom plane. Displacements of pixels in the side planes are calculated by using the side planes of each frame, and displacements of pixels in the top plane and the bottom plane are calculated by using the displacements of the side planes. Then, the pixels in the side planes, the top plane and the bottom plane of each frame are shifted according the displacements of the polyhedral mapping projection to generate a shifted polyhedral mapping projection. The shifted polyhedral mapping projection is transformed into a shifted frame with 2D space format. The shifted frames and corresponding frames construct 3D images and the 3D images are encoded into a 3D panoramic video.

20 Claims, 11 Drawing Sheets

(51) Int. Cl.
*H04N 13/161* (2018.01)
*H04N 13/106* (2018.01)
*G06T 3/20* (2006.01)
*G06T 3/60* (2006.01)
*H04N 13/00* (2018.01)

(52) U.S. Cl.
CPC ............ *H04N 13/161* (2018.05); *G06T 3/20* (2013.01); *G06T 3/60* (2013.01); *H04N 2013/0081* (2013.01)

(56) References Cited

U.S. PATENT DOCUMENTS

| | | | |
|---|---|---|---|
| 2013/0063576 A1* | 3/2013 | Okubo | G02B 27/2214 348/51 |
| 2013/0100132 A1* | 4/2013 | Katayama | H04N 13/275 345/420 |
| 2014/0327745 A1 | 11/2014 | Drouot | |
| 2016/0088287 A1 | 3/2016 | Sadi et al. | |
| 2017/0280126 A1* | 9/2017 | Van Der Auwera | G06T 3/0062 |

FOREIGN PATENT DOCUMENTS

| | | |
|---|---|---|
| CN | 106162139 | 11/2016 |
| TW | I486052 | 5/2015 |

\* cited by examiner

METHOD AND APPARATUS FOR GENERATING THREE-DIMENSIONAL PANORAMIC VIDEO

CROSS-REFERENCE TO RELATED APPLICATION

This application claims the priority benefit of U.S. provisional application Ser. No. 62/546,137, filed on Aug. 16, 2017, and also the priority benefit of Taiwan application serial no. 107100258, filed on Jan. 4, 2018. The entirety of each of the above-mentioned patent applications is hereby incorporated by reference herein and made a part of this specification.

BACKGROUND OF THE INVENTION

Field of the Invention

The invention relates to a method and an apparatus for generating a video, and particularly relates to a method and an apparatus for generating a three-dimensional panoramic video.

Description of Related Art

A spherical panoramic camera system mainly uses one or a plurality of cameras to capture a spherical panoramic video with a field of view (FOV) of 360 degrees along a horizontal axis and a FOV of 180 degrees along a vertical axis. In this way, an overall environment in all directions around the camera system (or an expected viewer) may be captured for applying to, for example, a virtual reality (VR) application. In recent years, along with development of technology, the video captured by the spherical panoramic camera system may be presented by a display device in a three-dimensional (3D) manner.

However, most of the spherical panoramic video content is only used for two-dimensional (2D) displays, so there is a need for transforming the digital content of the 2D spherical panoramic video presentation into the 3D spherical panoramic video presentation.

SUMMARY OF THE INVENTION

The invention is directed to a method and an apparatus for generating a three-dimensional panoramic video, which project frames of a panoramic video on a polyhedron and calculate displacements of pixels in each of the projections, so as to shift the pixels to obtain frames with parallax, and the obtained frames are combined with original frames to produce the 3D panoramic video.

The invention provides a method for generating a three-dimensional panoramic video, which is used in an electronic apparatus having a processor. The method includes following steps. A plurality of frames are captured from a panoramic video, and each frame is transformed into a polyhedral mapping projection, where the polyhedral mapping projection includes a plurality of side planes, a top plane and a bottom plane. Displacements of a plurality of pixels in the side planes are calculated by using the side planes of the transformed polyhedral mapping projection of each frame, and displacements of a plurality of pixels in the top plane and the bottom plane of the polyhedral mapping projection are calculated by using the displacements of the side planes. Then, the pixels in the side planes, the top plane and the bottom plane of the polyhedral mapping projection of each frame are shifted according the calculated displacements of the polyhedral mapping projection to generate a shifted polyhedral mapping projection. The shifted polyhedral mapping projection is transformed into a shifted frame with a 2D space format, and the shifted frame and its corresponding frame are combined into a 3D image for each frame, and the 3D images are encoded into a 3D panoramic video.

The invention provides a three-dimensional panoramic video generating apparatus having a connection device, a storage device and a processor. The connection device is connected to an image source device, and is configured to receive a panoramic video from the image source device. The storage device is configured to store a plurality of modules. The processor is coupled to the connection device and the storage device, and is configured to load and execute the modules in the storage device. The modules include a frame capturing module, a mapping module, a parallax calculating module, a pixel shifting module, a transforming module and a video encoding module. The frame capturing module captures a plurality of frames from the panoramic video; the mapping module transforms each frame into a polyhedral mapping projection, where the polyhedral mapping projection includes a plurality of side planes, a top plane and a bottom plane; the parallax calculating module calculates displacements of a plurality of pixels in the side planes by using the side planes of the transformed polyhedral mapping projection of each frame, and calculates displacements of a plurality of pixels in the top plane and the bottom plane of the polyhedral mapping projection by using the displacements of the side planes; the pixel shifting module shifts the pixels in the side planes, the top plane and the bottom plane of the transformed polyhedral mapping projection of each frame according the calculated displacements of the polyhedral mapping projection to generate a shifted polyhedral mapping projection; the transforming module transforms the shifted polyhedral mapping projection into a shifted frame with a 2D space format; and the video encoding module combines the shifted frame and its corresponding frame into a 3D image for each frame and encodes the 3D images into a 3D panoramic video.

According to the above description, the method and the apparatus for generating the three-dimensional panoramic video of the invention transform each frame of a spherical panoramic video with the 2D space format into a polyhedral mapping projection in a 3D space, and calculate displacements of the pixels in each plane of the mapping projection, so as to shift the pixels and then transform the shifted frames back to the 2D space format. In this way, the shifted frames and the corresponding original frames are combined as 3D panoramic images, and the 3D panoramic images are encoded into the 3D panoramic video.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to present 2D spherical panoramic video in a 3D manner, the apparatus of the invention not only transforms each frame in the spherical panoramic video into a polyhedral mapping projection in a 3D space, and calculates displacements of each pixel in the side planes of each frame, but also deduces displacements of each pixel in a top plane and a bottom plane according to the displacements of the side planes. According to the above calculated or deduced displacements, the pixels in the side planes, the top plane and the bottom plane of the transformed mapping projection of each frame are shifted, so as to obtain a shifted mapping projection. Then, the shifted mapping projection is transformed back to a shifted frame with a 2D space format, and the shifted frames and corresponding original frames are respectively allocated to be presented to left and right eyes to obtain 3D images. Then, the obtained 3D images are encoded to generate a panoramic video with a 3D effect.

Figure 1:
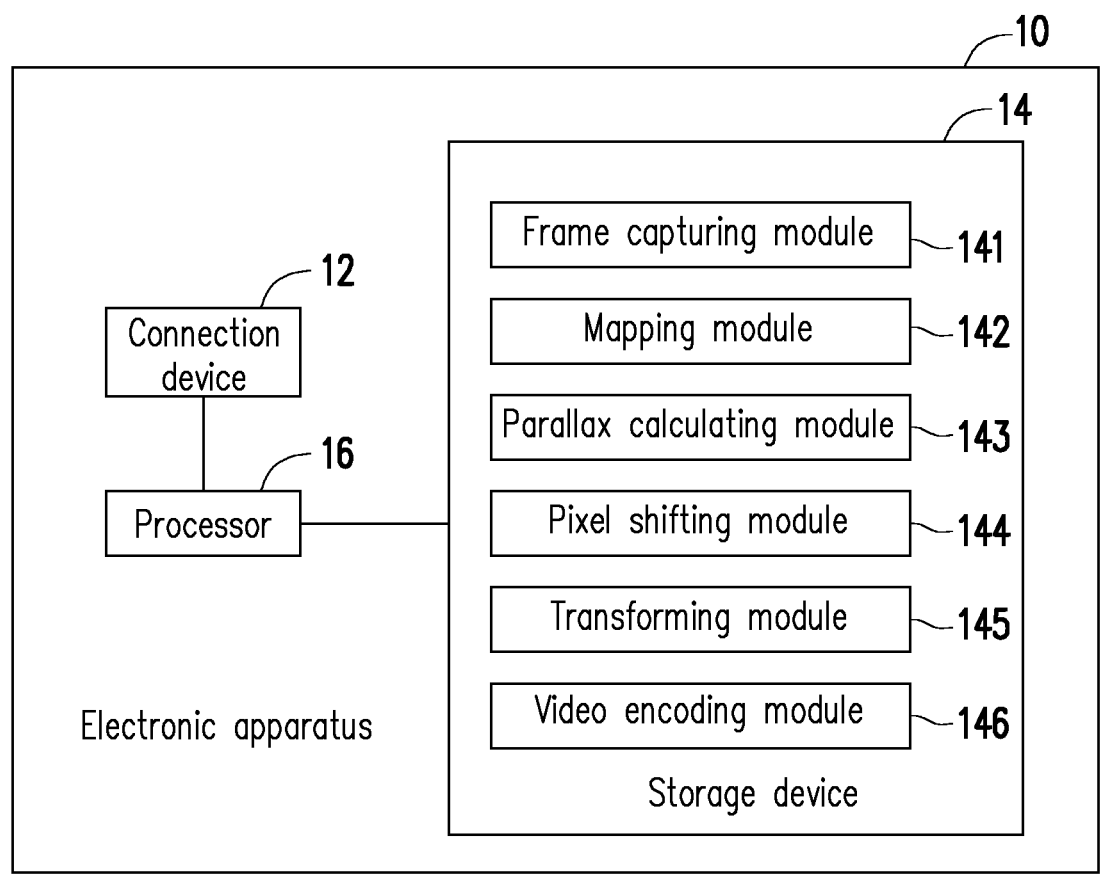
FIG. 1 is a block diagram of a 3D panoramic video generating apparatus according to an embodiment of the invention.

FIG. 1 is a block diagram of a 3D panoramic video generating apparatus according to an embodiment of the invention. The 3D panoramic video generating apparatus of the present embodiment is, for example, an electronic apparatus 10 of FIG. 1, which is, for example, a camera, a video camera, a mobile phone, a personal computer, a VR headset, a cloud server or other device having a computation function, and at least includes a connection device 12, a storage device 14 and a processor 16, and functions thereof are described as follows.

The connection device 12 is, for example, a wired or wireless transmission interface such as universal serial bus (USB), RS232, Bluetooth, wireless fidelity (Wi-Fi), etc., which may be connected to an image source device to receive a video from the image source device. The image source device is, for example, a panoramic camera capable of capturing a panoramic video, a hard disk or memory card storing the panoramic video, or a server located at a remote end and used for storing the panoramic video, which is not limited by the invention.

The storage device 14 is, for example, any type of a fixed or movable random access memory (RAM), a read-only memory (ROM), a flash memory or a similar device or a combination of the above devices. In the present embodiment, the storage device 14 is used for storing a frame capturing module 141, a mapping module 142, a parallax calculating module 143, a pixel shifting module 144, a transforming module 145 and a video encoding module 146.

The processor 16 is, for example, a central processing unit (CPU), or other programmable general purpose or special purpose microprocessor, a digital signal processor (DSP), a programmable controller, an application specific integrated circuit (ASIC), a programmable logic device (PLD) or other similar device or a combination of the above devices, and the processor 16 is coupled to the connection device 12 and the storage device 14.

In the present embodiment, the modules stored in the storage device 14 are, for example computer programs, and may be loaded by the processor 16, so as to execute a method for generating a three-dimensional panoramic video of the invention. Detailed steps of the method are described below with reference of an embodiment.

Figure 2:
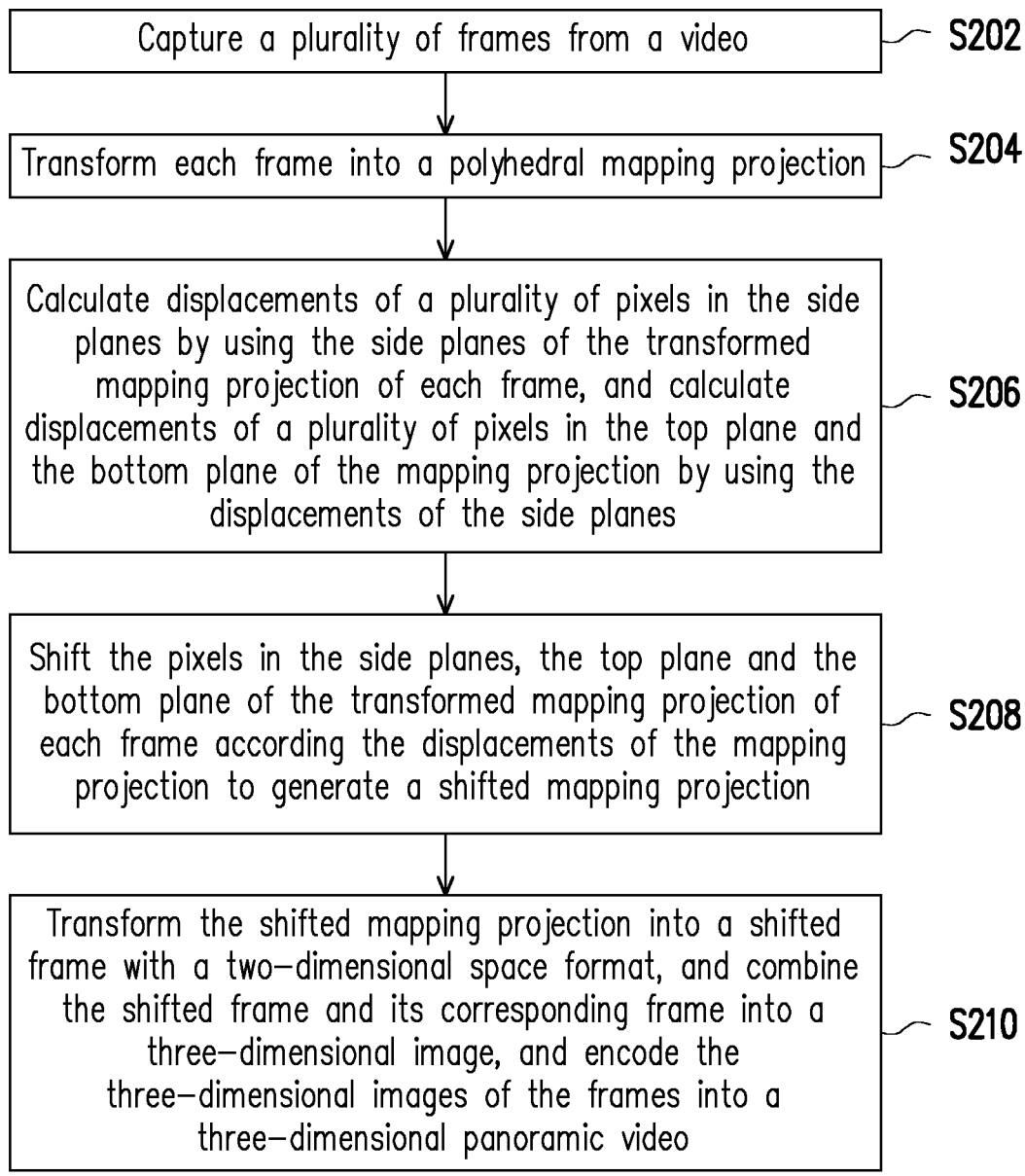
FIG. 2 is a flowchart illustrating a method for generating a 3D panoramic video according to an embodiment of the invention.

FIG. 2 is a flowchart illustrating a method for generating a 3D panoramic video according to an embodiment of the invention. Referring to FIG. 1 and FIG. 2, the method of the present embodiment is for use in the electronic apparatus 10 of FIG. 1, and detailed steps of the method for generating the three-dimensional panoramic video of the present embodiment are described below with reference of various components of the electronic apparatus 10 of FIG. 1.

First, the frame capturing module 141 captures a plurality of frames from a video received by the connection device 12 (step S202), where the frames may have a 2D space format, though the invention is not limited thereto. The video is, for example, a panoramic video received by the electronic apparatus 10 from the image source device, and the image source device may be a plurality of cameras configured on the electronic apparatus, and the cameras may capture videos of a front field of view (FOV), a back FOV, etc., and splice corresponding frames in the FOV videos into spherical panoramic frames of the 2D space format, so as to complete a spherical panoramic video. The image source device may also be the storage device 14 of the electronic apparatus 10, and the storage device 14 stores the captured spherical panoramic video, though the invention is not limited thereto.

It should be noted that in the present embodiment, the cameras used for capturing the videos are, for example, fisheye cameras, which have a viewing angle close to 180 degrees, and the FOV videos may cover a part of overlapped images to facilitate splicing. In other embodiments, the cameras may also be other cameras other than the fisheye cameras, and the corresponding FOV videos of the cameras may be not overlapped.

Moreover, in the present embodiment, each of the frames in the spherical panoramic video is represented in a format of equirectangular projection, where the equirectangular projection maps meridians to vertical straight lines of constant spacing and circles of latitudes to horizontal straight lines of constant spacing. In other embodiment, besides the equirectangular projection, a Miller cylindrical projection, a Cassini projection, etc. may also be adopted to represent each of the frames in the spherical panoramic video.

Figure 3:
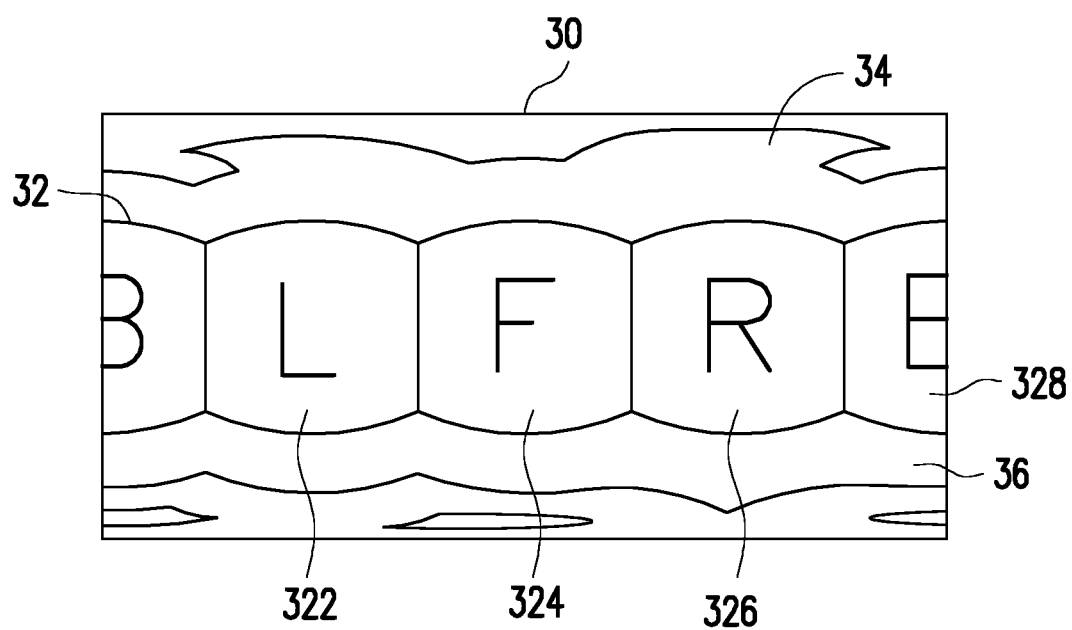
FIG. 3 is a schematic diagram of an equirectangular projection of each frame corresponding to a cube mapping projection according to an embodiment of the invention.

Referring back to the flow of FIG. 2, after the frames are captured, the mapping module 142 transforms each frame in the spherical panoramic video into a polyhedral mapping projection (step S204). In an embodiment, the mapping module 142, for example, adopts a cube mapping projection to project each frame in the spherical panoramic video to six square surfaces of a cube in a 3D space, and stores the projection as six square textures or as unfolded six regions of a single texture. For example, FIG. 3 is a schematic diagram of the equirectangular projection of each frame corresponding to the cube mapping projection according to an embodiment of the invention. Referring to FIG. 3, an equirectangular projection 30 of each frame includes image parts corresponding to a plurality of side planes 32, a top plane 34 and a bottom plane 36 of the cube mapping projection. The side planes 32 include a left plane 322, a front plane 324, a right plane 326 and a back plane 328. In other embodiments, the mapping module 142 may also use polyhedrons other than the cube, for example, triangular prisms, hexagonal prisms, etc., to implement the environment mapping projection of each frame in the spherical panoramic video. Generally, each frame in the spherical panoramic video may be projected to a polyhedron including a top surface, a bottom surface and a plurality of side surfaces to produce the top plane, the bottom plane and the side planes, where the top plane and the bottom plane respectively have a plurality of edges, and each edge of the top plane/bottom plane corresponds to an top/bottom edge of one of the side planes. For example, in case of the cube mapping projection, the number of the side planes is four, and the numbers of the edges of the top plane and the bottom plane are all four, which respectively correspond to the edges of the four side planes.

Figure 4A:
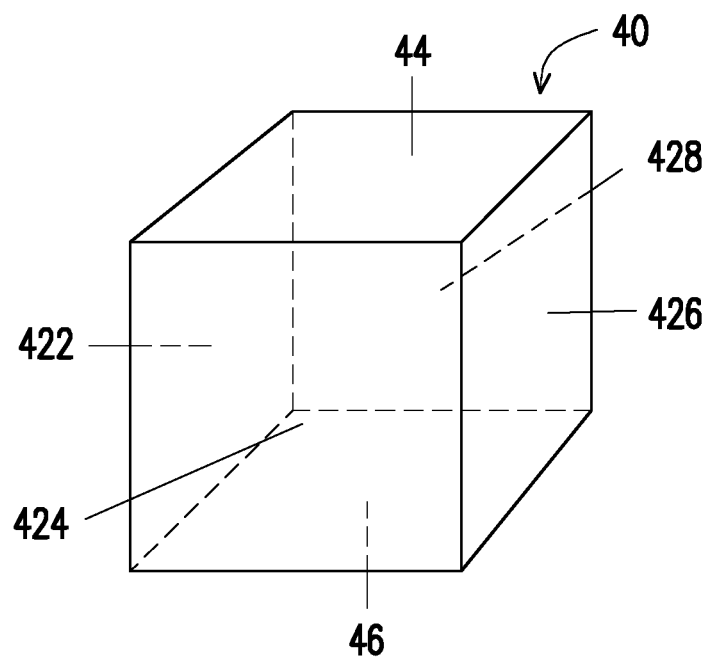
FIG. 4A and FIG. 4B are schematic diagrams of a cube mapping projection according to an embodiment of the invention.
Figure 4B:
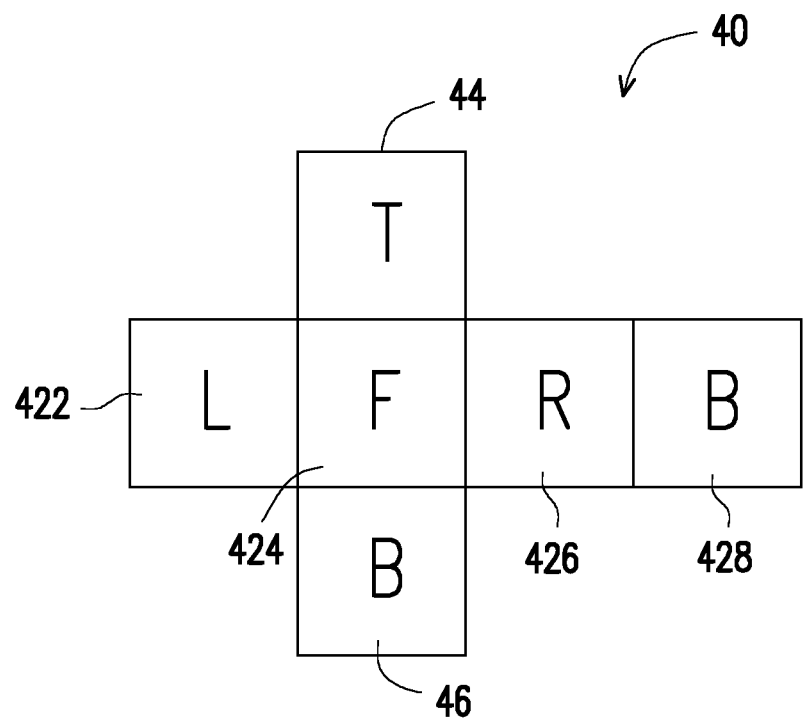

For example, FIG. 4A and FIG. 4B are schematic diagrams of a cube mapping projection according to an embodiment of the invention. Referring to FIG. 3, FIG. 4A and FIG. 4B, where FIG. 4B is an unfolded diagram of the cube 40. In the present embodiment, the equirectangular projection of each frame in the spherical panoramic video uses cube mapping to perform the mapping projection, which uses six surfaces of the cube 40 as the mapping shape. Namely, the image parts of the corresponding left plane 322, the front plane 324, the right plane 326, the back plane 328, the top plane 34 and the bottom plane 36 in the equirectangular projection 30 of each frame in the spherical panoramic video are respectively mapped and projected to the six surfaces of the cube 40 to generate a left plane 422, a front plane 424, a right plane 426, a back plane 428, a top plane 44 and a bottom plane 46, and stored as six squares. Transforming methods between the equirectangular projection and the cube mapping projection are well known by those skilled in the art, and the details thereof are not repeated here.

It should be noted that since the cube mapping is formed by first rendering the scene six times from a viewpoint defined by a 90 degree view frustum representing each cube surface, and when compared to the other types of mapping projection, pixel calculations thereof may be performed in a more linear fashion. Moreover, when a VR device is applied to display the spherical panoramic video, the video adopting the cube mapping projection format may be more supported by 3D graphics hardware acceleration. Moreover, in an embodiment, the left plane 422, the front plane 424, the right plane 426, the back plane 428, the top plane 44 and the bottom plane 46 in the mapping projection are squares having a same width (in units of pixels). In another embodiment, the width W (in units of pixels) of the left plane 422, the front plane 424, the right plane 426 and the back plane 428 may be ¼ of a horizontal resolution (in units of pixels) of each frame in the spherical panoramic video represented by the equirectangular projection. However, the invention is not limited thereto. In other embodiments, other tetragons, heights or widths may also be applied to the left plane 422, the front plane 424, the right plane 426, the back plane 428, the top plane 44 and the bottom plane 46.

Referring back to the flow of FIG. 2, after obtaining the transformed polyhedral mapping projection, the parallax calculating module 143 obtains the side planes of the transformed polyhedral mapping projection of each frame to calculate displacements of a plurality of pixels in the side planes, and calculates displacements of a plurality of pixels in the top plane and the bottom plane of the polyhedral mapping projection by using the displacements of the side planes (step S206). It should be noted that since depth perception is caused by horizontal separation parallax of the eyes, the displacements of the pixels in the top plane and the bottom plane (which are substantially parallel to a horizontal surface of eye separation) and the displacements of the pixels in the side planes (which are substantially orthogonal to the horizontal surface of eye separation) should be calculated in different methods.

In an embodiment, in order to obtain the displacement of each pixel in each frame of the spherical panoramic video, known depth estimation techniques may be applied to the side planes of the transformed mapping projection of each frame in the spherical panoramic video; for example, the relative blurriness method, the block-based matching method, the optical flow method, etc. may be used to calculate an initial displacement of each pixel in the side planes.

In the aforementioned depth estimation techniques, the relative blurriness method uses the fact that from the point of view of the focus of the camera, an object located farther away from the camera is blurrier than an object closer to the camera; therefore, the relative blurriness method calculates the displacement of each pixel based on the degree of blurriness of each pixel in the frame.

In the block-based matching method, one or a plurality of frames of the video is segmented into a plurality of blocks, and each of the blocks of a current frame may be compared with a shifted block of a same size in a reference frame, where a determined displacement associated with the minimum matching cost may be identified as an estimated motion magnitude for all the pixels in the block, and the motion magnitude may be used for calculating displacements of the pixels in one or a plurality of frames. For example, the pixel with a larger motion magnitude may be regarded as being closer to the camera.

On the other hand, the optical flow method is to identify motion of object brightness patterns; for example, an optical flow of each frame in the video may be regarded as a motion field, where each point is assigned with a velocity vector that describes its movement. The optical flow technique may use a brightness constancy equation to relate object velocities with pixel gradient-based intensity changes, which may calculate optical flow motion vectors of the pixels in one or a plurality of frames by using global or local optimization techniques. Proper known optical flow methods may include the Farneback method, the Lucas-Kanade method, the principal component analysis (PCA) method, etc. In some embodiments, any optical flow method may be applied to calculate the initial displacements of the pixels in the side planes.

In the present embodiment, in calculation of the displacements of the pixels in the side planes, an optical flow field among the side planes of the transformed mapping projection of each frame is first calculated, where the above optical flow field is expressed as an initial displacement in a plurality of directions of each pixel in the side planes of the transformed mapping projection of each frame. Then, optionally, a Gaussian smoothing calculation is performed on the initial displacements to obtain smoothened displacements. In an embodiment, the Gaussian smoothing calculation may include a temporal Gaussian smoothing calculation or a spatial Gaussian smoothing calculation.

Figure 5A:
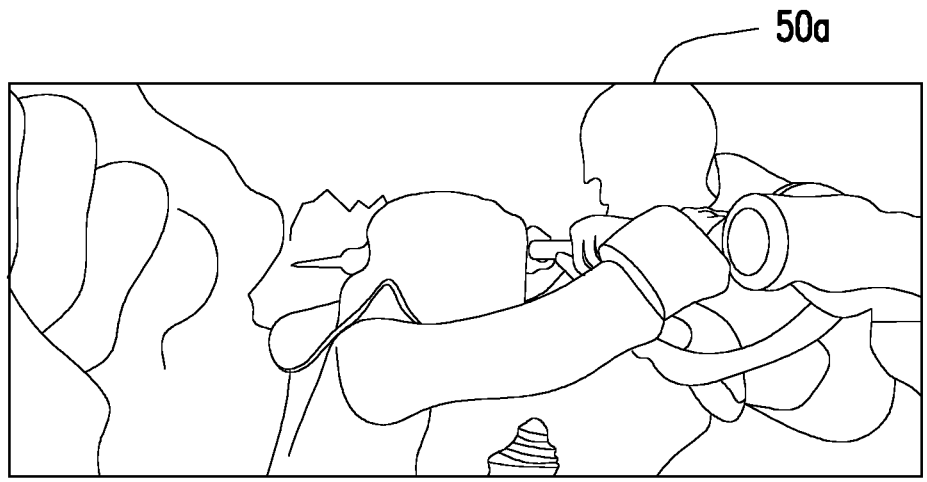
FIG. 5A and FIG. 5B are examples of side planes of a transformed mapping projection of each frame in a spherical panoramic video according to an embodiment of the invention.
Figure 5B:
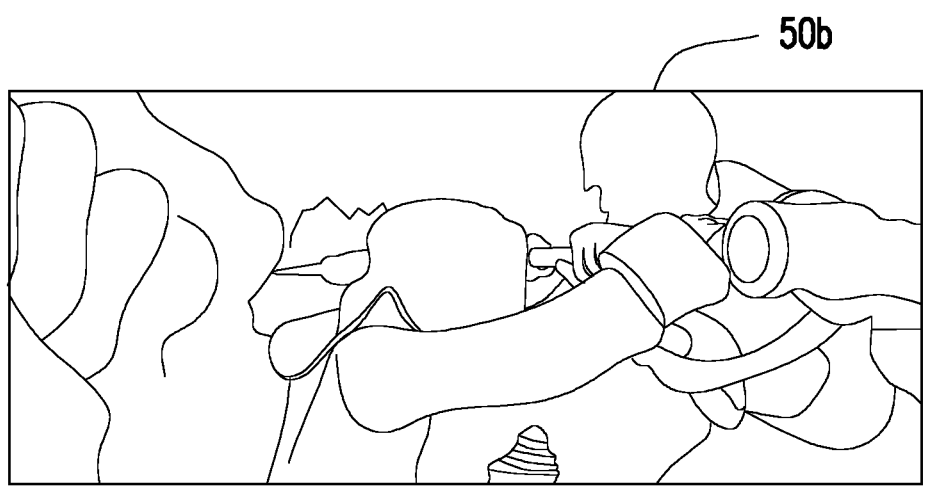

For example, FIG. 5A and FIG. 5B are examples of the side planes of the transformed mapping projection of each frame in the spherical panoramic video according to an embodiment of the invention. Referring to FIG. 5A and FIG. 5B, a frame 50a is a frame in the video at a time T, and a frame 50b is a frame in the video at a time T+1. In the present embodiment, the number of moved pixels between each pixel of the frame 50a and the pixels of the frame 50b in the video represents the initial displacement of each pixel in the side planes, where the pixels of objects located farther away from a viewer have smaller initial displacements, and pixels of objects located closer to the viewer have larger initial displacements.

In detail, the initial displacement $\Delta f_{(i,j),T}$ of each pixel (i,j) of the frame 50a in the video may include a horizontal displacement ($\Delta x_{(i,j),T}$) and a vertical displacement ($\Delta y_{(i,j),T}$) in Euclidian coordinates:

$$\Delta f_{(i,j),T} = \sqrt{\Delta x_{(i,j),T}^2 + \Delta y_{(i,j),T}^2}$$

Optionally, a Gaussian filter may be further used to perform temporal smoothing to the initial displacement to produce a smoothened displacement $\Delta f_{(i,j),T,smooth}$, for example:

$$\Delta f_{(i,j)T,smooth} = \frac{(\Delta f_{(i,j),T-2} + 4 \cdot \Delta f_{(i,j),T-1} + 6 \cdot \Delta f_{(i,j),T} + 4 \cdot \Delta f_{(i,j),T+1} + \Delta f_{(i,j),T+2})}{16}$$

In order to adapt the pixel displacement level to different image resolutions of different displays, the initial displacement (or the smoothened displacement) may be multiplied by a normalization factor P, where the normalization factor P is proportional to a resolution of the width W (in units of pixels) of the side planes of the transformed mapping projection of each frame in the spherical panoramic video, which is in turn proportional to the horizontal resolution (in units of pixels) of each frame in the spherical panoramic video represented by the equirectangular projection as described in the aforementioned embodiments, so that the final displacement $\Delta d_{(i,j)}$ of each pixel is:

$$\Delta d_{(i,j)} = \Delta f_{(i,j),T} \times P$$

Although the time T is omitted in the subscript of the final displacement $\Delta d_{(i,j)}$, those skilled in the art should understand that the final displacement is also calculated for each time T. In another embodiment, if an image resolution of the display is matched to the horizontal resolution of each frame in the spherical panoramic video, the normalization factor P may be 1, i.e. the final displacement is equal to the initial displacement. Optionally, a Gaussian blur filter may be further applied to perform spatial smoothing to the initial displacement to obtain a more smoothened final displacement. Those skilled in the art should understand that the sequence of performing the normalization, the temporal smoothing and the spatial smoothing may be changed according to different situations to obtain the final displacement. Moreover, parameters and/or filters used for the temporal smoothing and the spatial smoothing may also be adjusted.

Figure 6A:
FIG. 6A to FIG. 6C are examples of calculating displacement according to an embodiment of the invention.
Figure 6B:
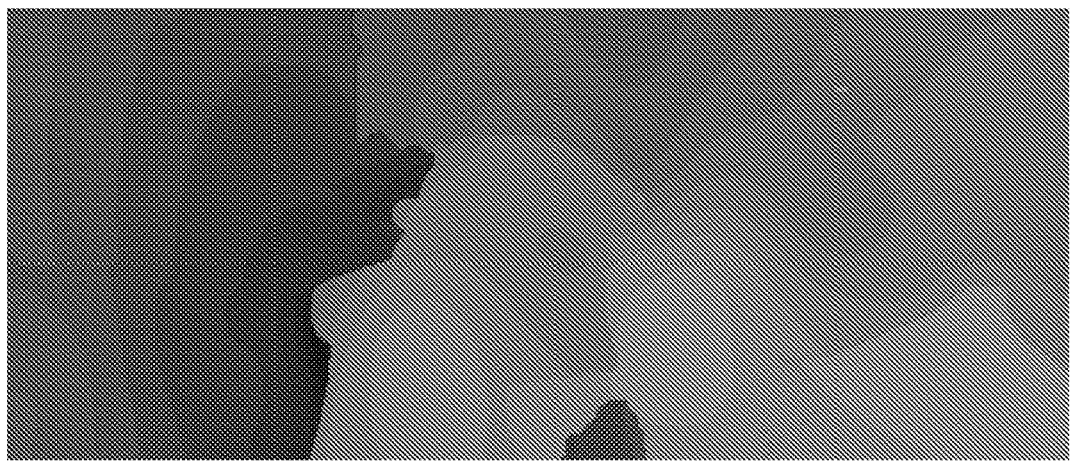
Figure 6C:
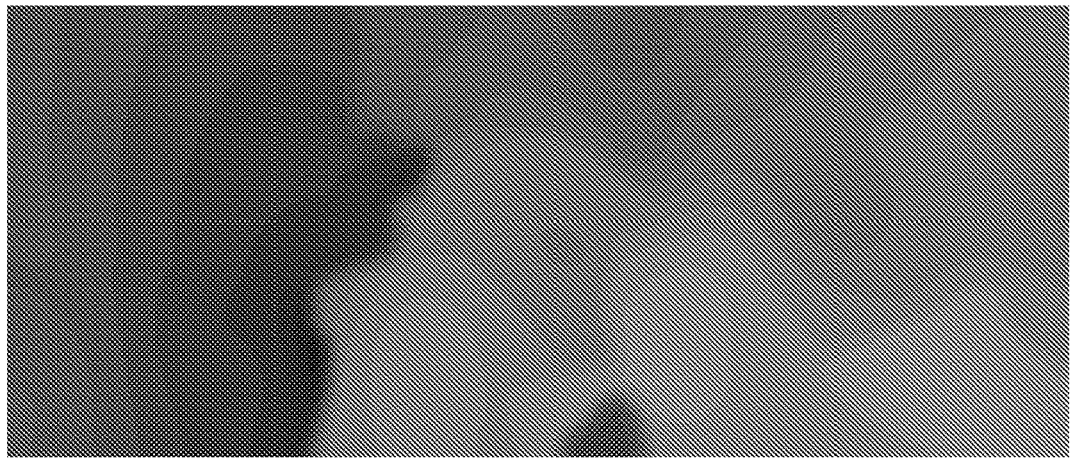

For example, FIG. 6A to FIG. 6C are examples of calculating displacement according to an embodiment of the invention. Referring to FIG. 6A to FIG. 6C, an image 60a is an optical flow field of a side plane of a frame after mapping projection, an image 60b presents an initial displacement of the side plane of the frame after mapping projection, and an image 60c presents a smoothened displacement of the side plane of the frame after mapping projection applied with Gaussian blur.

After the parallax calculating module 143 calculates the final displacement of each pixel in each of the side planes, the parallax calculating module 143 uses the final displacements of a plurality of edge pixels in each of the side planes located at boundaries with the top plane and the bottom plane to calculate displacements of a plurality of edge pixels of the top plane and the bottom plane, and then takes the displacements of the edge pixels as initial values to calculate displacements of the other pixels in the top plane and the bottom plane. In detail, the pixels of each row at the edge of the top plane and the edge of the bottom plane (i.e. the outermost row of the pixels in the top plane/bottom plane) are assigned with a displacement (for example, the final displacement $\Delta d_{(i,j)}$), where the assigned displacement is calculated according to the final displacement of each edge pixel at a top edge and a bottom edge in the side planes (i.e. the topmost/bottommost rows of the pixels in the side planes) that correspond to the edge pixels in the top plane and the bottom plane.

Figure 7:
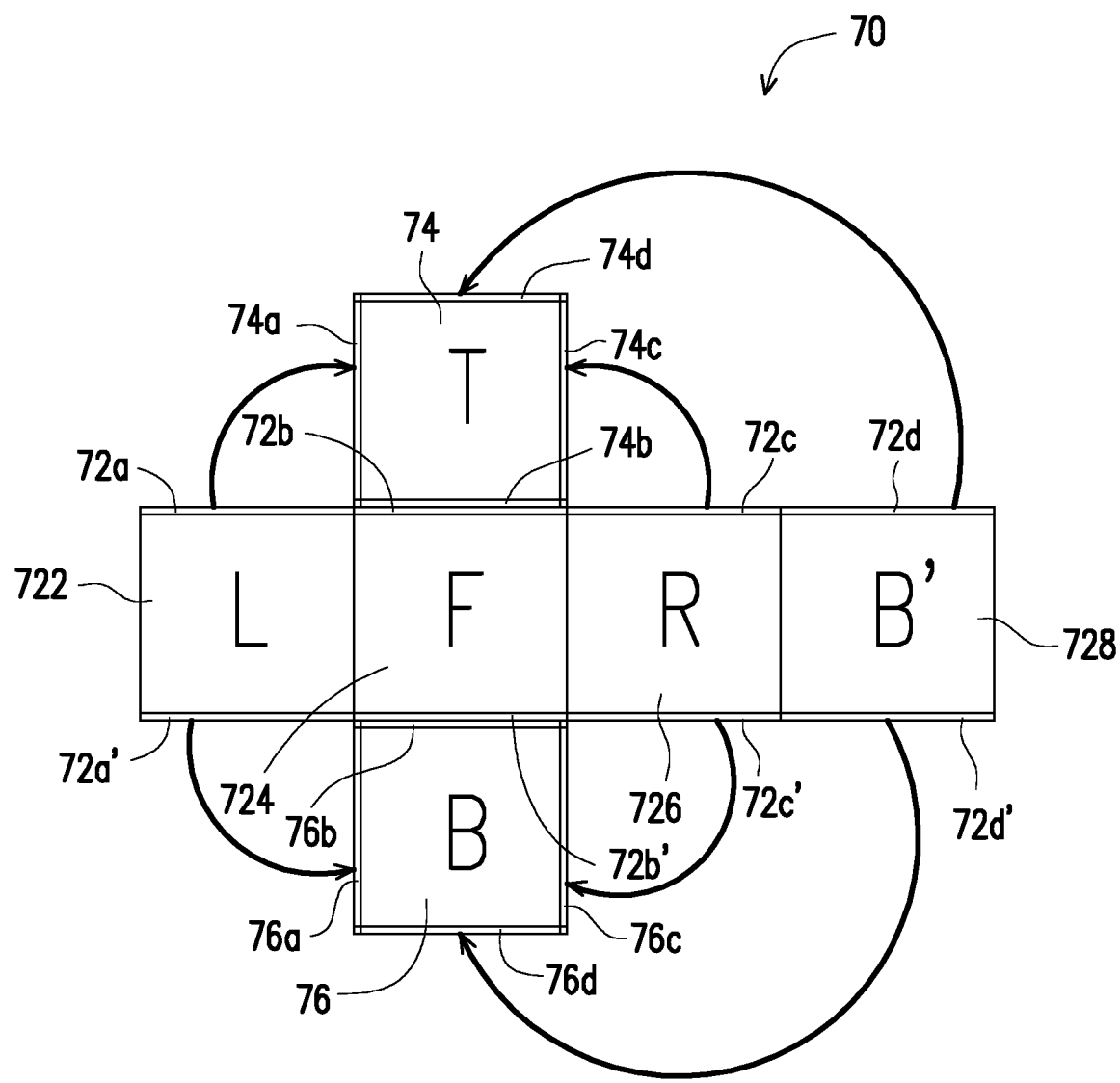
FIG. 7 is a cube mapping projection of a frame according to an embodiment of the invention.

For example, FIG. 7 is a cube mapping projection of a frame according to an embodiment of the invention. Referring to FIG. 7, the cube mapping projection 70 of the present embodiment is constituted by six squares including a left plane 722, a front plane 724, a right plane 726, a back plane 728, a top plane 74 and a bottom plane 76. In the present embodiment, the top plane 74 includes four edges 74a, 74b, 74c and 74d, the left plane 722 includes an edge 72a corresponding to the top plane 74 and an edge 72a' corresponding to the bottom plane 76, the front plane 724 includes an edge 72b corresponding to the top plane 74 and an edge 72b' corresponding to the bottom plane 76, the right plane 726 includes an edge 72c corresponding to the top plane 74 and an edge 72c' corresponding to the bottom plane 76, the back plane 728 includes an edge 72d corresponding to the top plane 74 and an edge 72d' corresponding to the bottom plane 76. The bottom plane 76 includes four edges 76a, 76b, 76c and 76d.

To be specific, in an embodiment, calculation of the displacement of each pixel at the edge 74a, the edge 74b, the edge 74c and the edge 74d of the top plane 74 is as follows. The final displacement of each pixel of the edge 72a of the left plane 722 is assigned to the corresponding edge 74a to become the displacement of each pixel of the edge 74a; the final displacement of each pixel of the edge 72b of the front plane 724 is assigned to the corresponding edge 74b to become the displacement of each pixel of the edge 74b; the final displacement of each pixel of the edge 72c of the right plane 726 is assigned to the corresponding edge 74c to become the displacement of each pixel of the edge 74c; the final displacement of each pixel of the edge 72d of the back plane 728 is assigned to the corresponding edge 74d to become the displacement of each pixel of the edge 74d. Since the four pixels of the four corners of the top plane 74 may respectively correspond to the pixels of the two topmost vertexes of two adjacent planes, any one of two final displacements of the pixels of the two topmost vertexes of the two adjacent planes or an average of the final displacements of the pixels of the two topmost vertexes is respectively assigned to the displacements of the aforementioned four pixels. Calculation of the displacements of the edge pixels of the bottom plane 76 is similar to that of the top plane 74, and the details thereof are not repeated here.

After the parallax calculating module 143 assigns the displacements of the edge pixels of the top plane and the bottom plane, the parallax calculating module 143 respectively segments the top plane and the bottom plane into a plurality of blocks, and calculates a displacement of each of the other pixels in the top plane and the bottom plane according to displacements of a plurality of adjacent pixels around the pixel depending on the corresponding block. In brief, after the displacements of the pixels of each row at the edges of the top plane and the bottom plane are determined, the displacement of each internal pixel of the top plane and the bottom plane may be calculated sequentially from outside to inside according to displacements of their adjacent pixels.

Figure 8A:
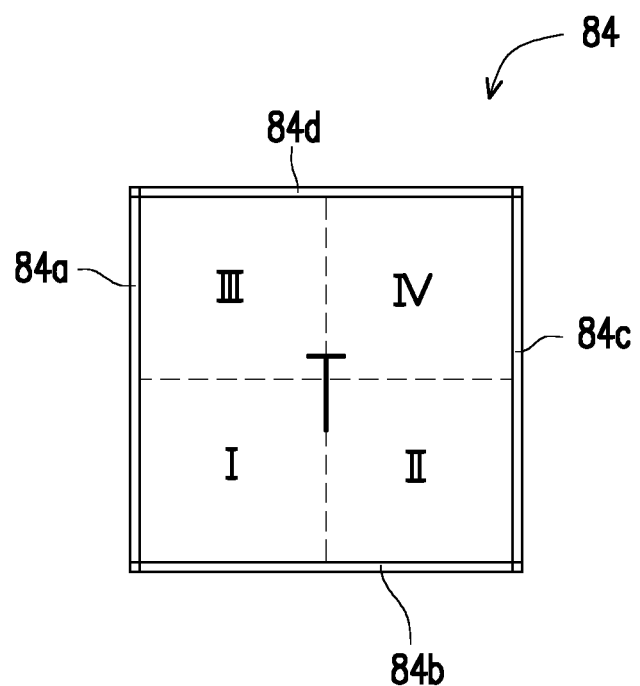
FIG. 8A to FIG. 8E are examples of calculating displacements of a top plane according to an embodiment of the invention.
Figure 8B:
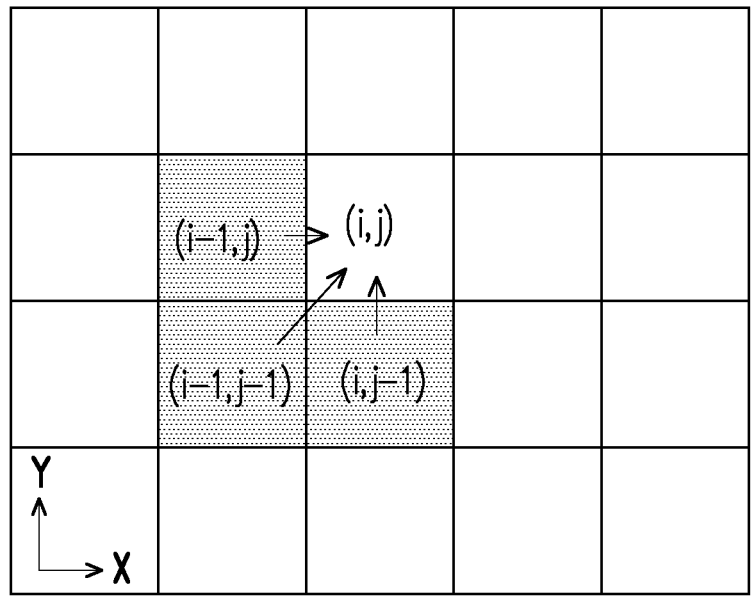
Figure 8C:
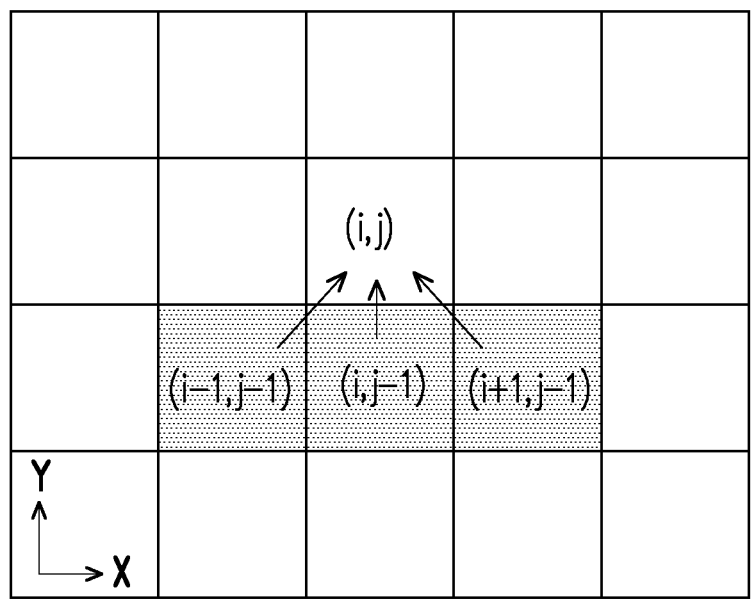
Figure 8D:
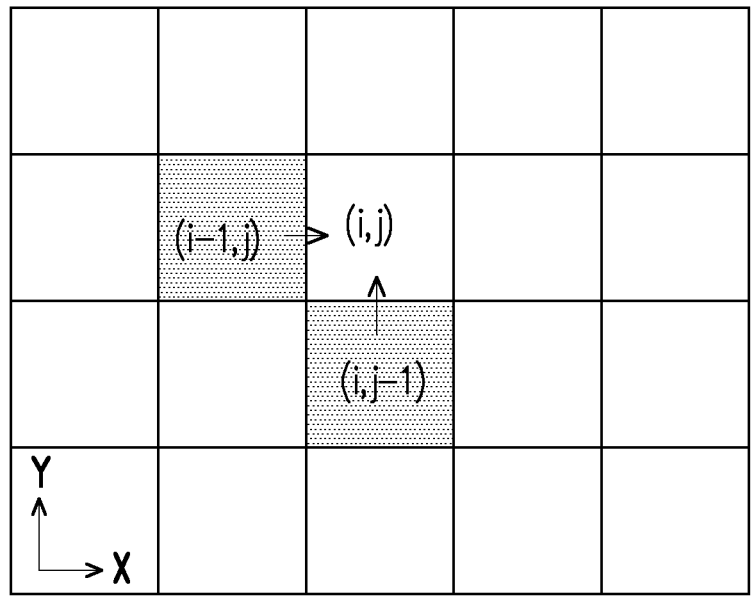
Figure 8E:
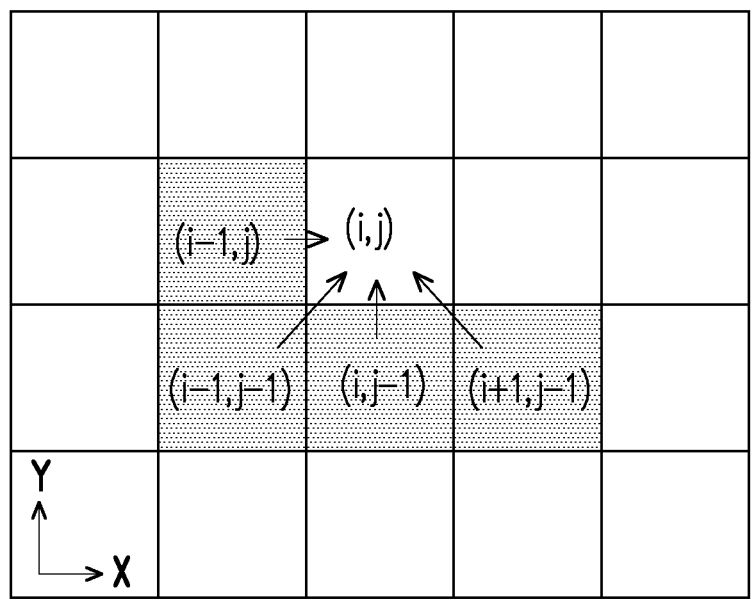

For example, FIG. 8A to FIG. 8E are examples of calculating displacements of the top plane according to an embodiment of the invention. Referring to FIG. 8A, the top plane 84 of the cube mapping projection of the present embodiment is segmented into four blocks I-IV, and the displacements of each pixel of an edge 84a, an edge 84b, an edge 84c and an edge 84d have already been specified. Then, calculation of the displacements of the internal pixels of each of the blocks I-IV is described with reference of FIG. 8B to FIG. 8E. In the embodiment of FIG. 8B, a displacement of an internal pixel (i,j) may be obtained according to an arithmetic mean of displacements of three adjacent pixels (for example, a pixel (i−1,j), a pixel (i−1,j−1) and a pixel (i,j−1)). In another embodiment of FIG. 8C, a displacement of an internal pixel (i,j) may be obtained according to an arithmetic mean of displacements of three adjacent pixels (for example, a pixel (i−1,j−1), a pixel (i,j−1) and a pixel (i+1,j−1)). In another embodiment of FIG. 8D, a displacement of an internal pixel (i,j) may be obtained according to an arithmetic mean of displacements of two adjacent pixels (for example, a pixel (i−1,j) and a pixel (i,j−1)). In another embodiment of FIG. 8E, a displacement of an internal pixel (i,j) may be obtained according to an arithmetic mean of displacements of four adjacent pixels (for example, a pixel (i−1,j), a pixel (i−1,j−1), a pixel (i,j−1) and a pixel (i+1,j−1)).

In another embodiment of the invention, the following equations are used for calculating the displacements of the internal pixels in the aforementioned blocks I-IV, where i=0, i=W−1, j=0 or j=W−1 (W is the width of the top plane) correspond to the four edge pixel rows:

Block *I*:

$$\Delta d_{(i,j),I} = \frac{\Delta d_{(i-1,j-1)} + \Delta d_{(i-1,j)} + \Delta d_{(i,j-1)}}{3} \times \frac{3}{3+g},$$

where $i = 1, \ldots, \frac{W}{2} - 1$ and $j = 1, \ldots, \frac{W}{2} - 1$.

Block *II*:

$$\Delta d_{(i,j),II} = \frac{\Delta d_{(i+1,j-1)} + \Delta d_{(i,j-1)} + \Delta d_{(i+1,j)}}{3} \times \frac{3}{3+g},$$

where $i = \frac{W}{2}, \ldots, W-2$ and $j = 1, \ldots, \frac{W}{2} - 1$.

Block *III*:

$$\Delta d_{(i,j),III} = \frac{\Delta d_{(i-1,j+1)} + \Delta d_{(i-1,j)} + \Delta d_{(i,j+1)}}{3} \times \frac{3}{3+g},$$

where $i = 1, \ldots, \frac{W}{2} - 1$ and $j = \frac{W}{2}, \ldots, W-2$.

Block *IV*:

$$\Delta d_{(i,j),IV} = \frac{\Delta d_{(i+1,j+1)} + \Delta d_{(i+1,j)} + \Delta d_{(i,j+1)}}{3} \times \frac{3}{3+g},$$

where $i = \frac{W}{2}, \ldots, W-2$ and $j = \frac{W}{2}, \ldots, W-2$.

FIG. 8B illustrates relative positions of the three adjacent pixels used in calculation of the displacement of each of the pixels in the block I. In the above equations, a decrement parameter g is used for gradually decreasing the displacements of the internal pixels, such that the more the pixel is close to a center (i.e. the zenith) of the top plane, the more the displacement thereof is close to zero, and the decrement parameter g may be any number between 0 and 1 (for example, 0.1). In other embodiments, the factor 3/(3+g) may also be omitted, such that the displacements are not gradually decreased.

It should be noted that the displacement calculating methods shown in FIG. 8B to FIG. 8E are only examples, and the invention is not limited thereto. In another embodiment, the top plane 84 may be segmented into four blocks along diagonals as that shown in FIG. 9 to calculate the displacements of the internal pixels of the blocks I'-IV', or the top plane 84 may be segmented into other number of blocks (for example, six or eight blocks). The following equation is another example for calculating the displacements of the internal pixels of the block I' of FIG. 9:

Block *I'*:

$$\Delta d_{(i,j),I'} = \frac{\Delta d_{(i-1,j-1)} + \Delta d_{(i,j-1)} + \Delta d_{(i+1,j-1)}}{3} \times \frac{3}{3+g},$$

where $i = 1, \ldots, W - 2$ and $$j = \begin{cases} 1, \ldots, i, & \text{when } i = 1, \ldots, \frac{W}{2} - 1 \\ 1, \ldots, W - 1 - i, & \text{when } i = \frac{W}{2}, \ldots, W - 2 \end{cases}.$$

In other embodiments, the displacement of the internal pixel may be determined according to a geometric mean or median of the displacements of the adjacent pixels. In the present embodiment, although the displacements of the edge pixels of the top plane and the bottom plane are respectively assigned with as the final displacements of one row of the edge pixels of the top edge and the bottom edge of the corresponding side plane, in another embodiment, the displacements of the edge pixels of the top plane and the bottom plane may also be assigned as the final displacements of one row of the edge pixels of the top edge and the bottom edge of the corresponding side plane multiplied by a constant; in another embodiment, the displacements of the edge pixels of the top plane and the bottom plane may also be determined according to the final displacements of a corresponding plurality of the edge pixels of the top edge and the bottom edge of the side planes (for example, an average of the final displacements of two pixels closest to the edge). Moreover, detailed implementation of the bottom plane is similar to the top plane 84, and the details thereof are not repeated here.

Referring back to the flow of FIG. 2, after the displacements of each of the pixels of the side planes, the top plane and the bottom plane are calculated, a shift amount and a shift direction of each pixel between a left eye frame and a right eye frame of the frames of the spherical panoramic video may be determined according to the displacements of each of the pixels. In an embodiment, pixels of an object located farther away from a viewer should have a smaller shift amount, and pixels of an object located closer to the viewer should have a larger shift amount. In an embodiment, the shift amount of each pixel between the left eye frame and the right eye frame may be equal to the displacement of each pixel calculated according to the aforementioned methods. In another embodiment, the shift amount of each pixel between the left eye frame and the right eye frame may be equal to the displacement of each pixel calculated according to the aforementioned methods multiplied by a constant, and the constants multiplied by the displacements of each pixel in the side planes and the top plane and the bottom plane may be the same or different. However, the relationship between the shift amount of each pixel and the displacement of the pixel is not limited thereto. The pixel shifting module 144 shifts the pixels in the side planes, the top plane and the bottom plane of the transformed mapping projection of each frame according the calculated displacements of the mapping projection to generate a shifted mapping projection (step S208).

Regarding the shifting of the side planes, the pixel shifting module 144 shifts the pixels of the side planes according to the displacements of the pixels of the side planes to generate shifted side planes, and the side planes are, for example, shifted rightward in a horizontal wraparound manner. For example, referring to the cube mapping projection 70 of FIG. 7, when the left plane 722, the front plane 724, the right plane 726 and the back plane 728 are shifted rightward, the pixels shifted out of the rightmost edge of the back plane 728 are shifted and supplemented back to the leftmost edge of the left plane 722. However, the shift direction of the side planes is not limited thereto, and the pixels of the side planes may also be shifted leftward.

Regarding the shifting of the top plane and the bottom plane, the pixel shifting module 144 rotates the pixels of the top plane in one of a clockwise direction and a counterclockwise direction according to the displacements of the pixels of the top plane to generate a shifted top plane, and rotates the pixels of the bottom plane in the other one of the clockwise direction and the counterclockwise direction according to the displacements of the pixels of the bottom plane to generate a shifted bottom plane, where the shifted side planes, the shifted top plane and the shifted bottom plane constitute the shifted mapping projection. In an embodiment, when the pixels of the side planes are shifted rightward in the horizontal wraparound manner, the pixels of the top plane are rotated in the counterclockwise direction and the pixels of the bottom plane are rotated in the clockwise direction; when the pixels of the side planes are shifted leftward in the horizontal wraparound manner, the pixels of the top plane are rotated in the clockwise direction and the pixels of the bottom plane are rotated in the counterclockwise direction. As for the details of the aforementioned rotation, in an embodiment, the pixel shifting module 144 respectively segments the top plane and the bottom plane into a plurality of blocks (for example, triangular blocks) from the center according to each of the edges, and shifts each of the pixels of each of the blocks according to the displacements of the pixels of the top plane and the bottom plane. A shift direction of each pixel in each of the blocks may be parallel to a direction of the edge corresponding to the block, or may be approximate to a clockwise direction or a counterclockwise direction that takes the plane center as the center of the circle. When the pixels of the top plane are shifted out of its block and in to the adjacent block, the pixels are turned according to the shifting direction of the adjacent block and are continuously shifted in the adjacent block; and when the pixels of the bottom plane are shifted out of its block and in to the adjacent block, the pixels are turned according to the shifting direction of the adjacent block and are continuously shifted in the adjacent block.

Figure 9:
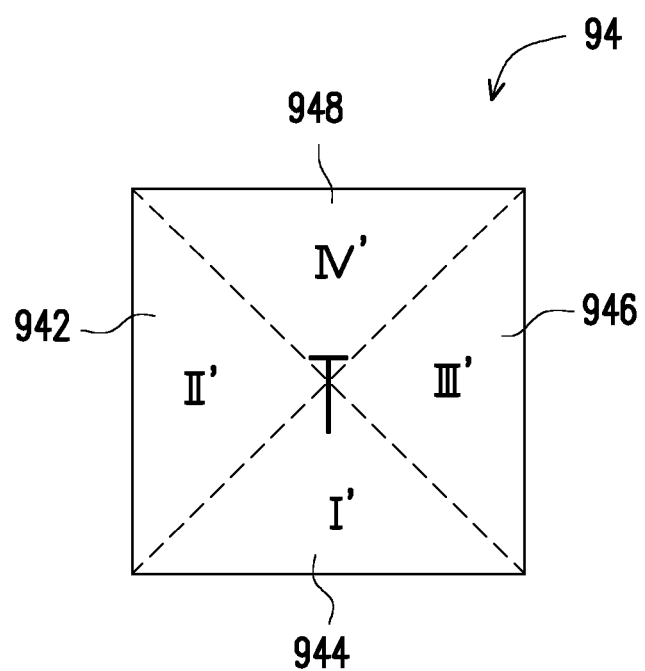
FIG. 9 is a schematic diagram of rotation shift of a top plane of the cube mapping projection according to an embodiment of the invention.

For example, FIG. 9 is a schematic diagram of rotation shift of a top plane of the cube mapping projection according to an embodiment of the invention. Referring to the top plane 94 of FIG. 9, in the present embodiment, the top plane 94 is segmented from the center along the diagonals into four triangular blocks corresponding to the four edges, and the four triangular blocks are a triangular block 942, a triangular block 944, a triangular block 946 and a triangular block 948. The top plane is rotated and shifted in a direction approximate to the counterclockwise direction according to the displacements of each of the pixels, and a detailed shift method thereof is as follows. Each of the pixels of the triangular block 942 is shifted downward, each of the pixels of the triangular block 944 is shifted rightward, each of the pixels of the triangular block 946 is shifted upward, and each of the pixels of the triangular block 948 is shifted leftward.

It should be noted that rotation directions of each of the pixels in the bottom plane is opposite to the rotation directions of each pixel in the top plane. In the aforementioned embodiment, each of the pixels in the bottom plane is rotated and shifted in a direction approximate to the clockwise direction. Implementation details of the rotation shift of each of the blocks of the bottom plane is similar to those of the top plane 94, and the details thereof are not repeated here. However, the rotation shift directions of the top plane and the bottom plane are not limited thereto. In another embodiment, the top plane and the bottom plane may be segmented into other numbers or shapes of blocks, so that the pixels of the top plane and the bottom plane may be shifted in a way more approximate to the genuine clockwise direction or the genuine counterclockwise direction. In still another embodiment, the top plane and the bottom plane may not be segmented into blocks and all of the pixels of the top plane and the bottom plane may be directly shifted in the genuine clockwise direction or the genuine counterclockwise direction while taking the plane center as the center of the circle. In other embodiments, missing pixels may occur after the shift, and the missing pixels may be restored through known image inpainting algorithms (for example, the fast marching method, the Navier-Stokes equation method, etc.).

Referring back to the flow of FIG. 2, after the shifted mapping projection is generated, the transforming module 145 transforms the shifted mapping projection into a shifted frame with a 2D space format (step S210). To be specific, in an embodiment of the invention, the shifted frames of the cube mapping projection format are transformed back to frames of the equirectangular projection format. However, the aforementioned 2D space format is not limited thereto.

Finally, after the shifted frames are obtained, the video encoding module 146 combines the shifted frames and corresponding original frames into 3D images and encodes the 3D images of the frames into a 3D video (step S210). The 2D space format of the shifted frames may be the same with or different from the format of the original frames before being transformed into the polyhedral mapping projection. If the 2D space format of the shifted frames is different to the format of the original frames before being transformed into the polyhedral mapping projection, the shifted frames and the corresponding original frames may be additionally transformed into the same 2D space format. In detail, in an embodiment of the invention, the shifted frames of the equirectangular projection format of the spherical panoramic video and the corresponding original frames of the equirectangular projection format are respectively taken as left eye images and right eye images of the viewer to provide the 3D images. Although the shifted frames of the aforementioned embodiment are left eye images, and the original frames are the right eye images, those skilled in the art should understand that the original frames may be shifted in an opposite direction to achieve an implementation that the shifted frames are the right eye images, and the original frames are the left eye images. In an embodiment, the left eye images and the right eye images may be synchronously presented to the left eye and the right eye of the viewer, respectively, though the invention is not limited thereto.

After the aforementioned steps of mapping projection, parallax calculation, pixel shifting, format transformation and 3D image construction are performed on each of the frames in the spherical panoramic video, the 3D images may be encoded to generate the 3D spherical panoramic video. Since the images of the panoramic video of the 2D space format (for example, the equirectangular projection format) are highly nonlinear, known depth estimation techniques cannot be directly used to calculate the displacements of all of the pixels of the whole image. In the invention, the panoramic video is first transformed into the polyhedral mapping projection format to directly calculate the displacements of the side planes, and then the displacements of the top plane and the bottom plane are calculated according to the displacements of the side planes. In this way, the shift amount between the left eye image and the right eye image may be accurately and easily determined to generate the 3D spherical panoramic video.

In summary, the method and the apparatus for generating the 3D panoramic video of the invention transform each frame of the spherical panoramic video (e.g., with a 2D space format) into a polyhedral mapping projection in a 3D space, perform depth estimation to the side planes of each of the transformed polyhedral mapping projection, calculate displacements of the pixels in the side planes of each frame, calculate the displacements of the top plane and the bottom plane according to the displacements of the side planes, shift each of the pixels according to the displacement of each pixel, and transform the shifted frames of the polyhedral mapping projection format back to the 2D space format of the original frame, such that the shifted frames and the corresponding original frames may be combined to generate the 3D panoramic images that are encoded into the 3D panoramic video.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for generating a three-dimensional panoramic video, for use in an electronic apparatus having a processor, and comprising:
    capturing a plurality of frames from a panoramic video;
    transforming each of the frames into a polyhedral mapping projection, wherein the polyhedral mapping projection comprises a plurality of side planes, a top plane and a bottom plane;
    calculating displacements of a plurality of pixels in the side planes by using the side planes of the transformed polyhedral mapping projection of each of the frames, and calculating displacements of a plurality of pixels in the top plane and the bottom plane of the polyhedral mapping projection by using the displacements of the pixels of the side planes;
    shifting the pixels in the side planes, the top plane and the bottom plane of the transformed polyhedral mapping projection of each of the frames according the calculated displacements of the polyhedral mapping projection to generate a shifted polyhedral mapping projection; and
    transforming, for each of the frames, the shifted polyhedral mapping projection into a shifted frame with a two-dimensional space format, and combining the shifted frame and its corresponding frame into a three-dimensional image, and encoding the three-dimensional images of the frames into a three-dimensional panoramic video.

2. The method as claimed in claim 1, wherein the step of calculating the displacements of the pixels in the side planes by using the side planes of the transformed polyhedral mapping projection of each of the frames comprises:
    calculating an initial displacement of each of the pixels in the side planes of the transformed polyhedral mapping projection of each of the frames, and multiplying the initial displacement by a normalization factor to obtain the displacement of each of the pixels, wherein the normalization factor is proportional to a horizontal resolution of the frames in the panoramic video.

3. The method as claimed in claim 1, wherein the step of calculating the displacements of the pixels in the top plane and the bottom plane of the polyhedral mapping projection by using the displacements of the pixels of the side planes comprises:
    calculating the displacements of a plurality of edge pixels in the top plane and the bottom plane located at boundaries with each of the side planes according to the displacements of a plurality of edge pixels in each of the side planes located at boundaries with the top plane and the bottom plane; and
    calculating the displacements of other pixels in the top plane and the bottom plane according to the displacements of the edge pixels in the top plane and the bottom plane.

4. The method as claimed in claim 3, wherein the step of calculating the displacements of the other pixels in the top plane and the bottom plane according to the displacements of the edge pixels in the top plane and the bottom plane comprises:
    respectively segmenting the top plane and the bottom plane into a plurality of blocks, and calculating the displacement of each of the other pixels in the top plane and the bottom plane according to displacements of a plurality of adjacent pixels around each of the other pixels in the corresponding block.

5. The method as claimed in claim 4, wherein the step of calculating the displacement of each of the other pixels in the top plane and the bottom plane according to the displacements of the adjacent pixels around each of the other pixels in the corresponding block comprises:
    calculating the displacement of each of the other pixels according to the displacements of the adjacent pixels around each of the other pixels and a decrement parameter, wherein the decrement parameter is used for decreasing the displacements of internal pixels such that the more the internal pixel is close to a center of the top plane or the bottom plane, the smaller the displacement thereof is.

6. The method as claimed in claim 1, wherein the step of shifting the pixels in the side planes, the top plane and the bottom plane of the transformed polyhedral mapping projection of each of the frames according the calculated displacements of the polyhedral mapping projection to generate the shifted polyhedral mapping projection comprises:

shifting the pixels of the side planes rightward or leftward in a horizontal wraparound manner according to the displacements of the side planes to generate shifted side planes;

rotating the pixels in the top plane in one of a clockwise direction and a counterclockwise direction according to the displacements of the top plane to generate a shifted top plane; and rotating the pixels in the bottom plane in the other one of the clockwise direction and the counterclockwise direction according to the displacements of the bottom plane to generate a shifted bottom plane, wherein the shifted side planes, the shifted top plane and the shifted bottom plane constitute the shifted polyhedral mapping projection.

7. The method as claimed in claim 6, wherein the step of rotating the pixels in the top plane in one of the clockwise direction and the counterclockwise direction according to the displacements of the top plane to generate the shifted top plane and rotating the pixels in the bottom plane in the other one of the clockwise direction and the counterclockwise direction according to the displacements of the bottom plane to generate the shifted bottom plane comprises:

segmenting the top plane into a plurality of blocks from a center thereof, and shifting each of the pixels of each of the blocks in a direction approximate to one of the clockwise direction and the counterclockwise direction according to the displacements of the top plane, wherein when the pixels are shifted out of the block and in to an adjacent block, the pixels are turned according to the direction in the adjacent block and are continuously shifted; and segmenting the bottom plane into a plurality of blocks from a center thereof, and shifting each of the pixels of each of the blocks in a direction approximate to the other one of the clockwise direction and the counterclockwise direction according to the displacements of the bottom plane, wherein when the pixels are shifted out of the block and in to an adjacent block, the pixels are turned according to the direction in the adjacent block and are continuously shifted.

8. The method as claimed in claim 6, wherein when the pixels of the side planes are shifted rightward in the horizontal wraparound manner, the pixels of the top plane are rotated in the counterclockwise direction and the pixels of the bottom plane are rotated in the clockwise direction; when the pixels of the side planes are shifted leftward in the horizontal wraparound manner, the pixels of the top plane are rotated in the clockwise direction and the pixels of the bottom plane are rotated in the counterclockwise direction.

9. The method as claimed in claim 1, wherein the polyhedral mapping projection is a cube mapping projection.

10. The method as claimed in claim 1, wherein the step of calculating the displacements of the pixels in the side planes by using the side planes of the transformed polyhedral mapping projection of each of the frames comprises:

using a principal component analysis optical flow method to calculate the displacements of the pixels in the side planes.

11. A three-dimensional panoramic video generating apparatus, comprising:

a connection device, connected to an image source device, and receiving a panoramic video from the image source device;

a storage device, storing a plurality of modules; and a processor, coupled to the connection device and the storage device, and loading and executing the modules in the storage device, wherein the modules comprise:

a frame capturing module, capturing a plurality of frames from the panoramic video;

a mapping module, transforming each of the frames into a polyhedral mapping projection, wherein the polyhedral mapping projection comprises a plurality of side planes, a top plane and a bottom plane;

a parallax calculating module, calculating displacements of a plurality of pixels in the side planes by using the side planes of the transformed polyhedral mapping projection of each of the frames, and calculating displacements of a plurality of pixels in the top plane and the bottom plane of the polyhedral mapping projection by using the displacements of the pixels of the side planes;

a pixel shifting module, shifting the pixels in the side planes, the top plane and the bottom plane of the transformed polyhedral mapping projection of each of the frames according the calculated displacements of the polyhedral mapping projection to generate a shifted polyhedral mapping projection;

a transforming module, transforming the shifted polyhedral mapping projection of each of the frames into a shifted frame with a two-dimensional space format; and a video encoding module, combining the shifted frame and its corresponding frame into a three-dimensional image and encoding the three-dimensional images of the frames into a three-dimensional panoramic video.

12. The three-dimensional panoramic video generating apparatus as claimed in claim 11, wherein the parallax calculating module calculates an initial displacement of each of the pixels in the side planes of the transformed polyhedral mapping projection of each of the frames, and multiplies the initial displacement by a normalization factor to obtain the displacement of each of the pixels, wherein the normalization factor is proportional to a horizontal resolution of the frames in the panoramic video.

13. The three-dimensional panoramic video generating apparatus as claimed in claim 11, wherein the parallax calculating module calculates the displacements of a plurality of edge pixels in the top plane and the bottom plane located at boundaries with each of the side planes according to the displacements of a plurality of edge pixels in each of the side planes located at boundaries with the top plane and the bottom plane, and calculates the displacements of other pixels in the top plane and the bottom plane according to the displacements of the edge pixels in the top plane and the bottom plane.

14. The three-dimensional panoramic video generating apparatus as claimed in claim 13, wherein the parallax calculating module respectively segments the top plane and the bottom plane into a plurality of blocks, and calculates the displacement of each of the other pixels in the top plane and the bottom plane according to displacements of a plurality of adjacent pixels around each of the other pixels in the corresponding block.

15. The three-dimensional panoramic video generating apparatus as claimed in claim 14, wherein the parallax calculating module calculates the displacement of each of the other pixels according to the displacements of the adjacent pixels around each of the other pixels and a decrement parameter, wherein the decrement parameter is used for decreasing the displacements of internal pixels such that the more the internal pixel is close to a center of the top plane or the bottom plane, the smaller the displacement thereof is.

16. The three-dimensional panoramic video generating apparatus as claimed in claim 11, wherein the pixel shifting module shifts the pixels of the side planes rightward or leftward in a horizontal wraparound manner according to the displacements of the side planes to generate shifted side planes, rotates the pixels in the top plane in one of a clockwise direction and a counterclockwise direction according to the displacements of the top plane to generate a shifted top plane, and rotates the pixels in the bottom plane in the other one of the clockwise direction and the counterclockwise direction according to the displacements of the bottom plane to generate a shifted bottom plane, wherein the shifted side planes, the shifted top plane and the shifted bottom plane constitute the shifted polyhedral mapping projection.

17. The three-dimensional panoramic video generating apparatus as claimed in claim 16, wherein the pixel shifting module segments the top plane into a plurality of blocks from a center thereof, and shifts each of the pixels of each of the blocks in a direction approximate to one of the clockwise direction and the counterclockwise direction according to the displacements of the top plane, wherein when the pixels are shifted out of the block and in to an adjacent block, the pixels are turned according to the direction in the adjacent block and are continuously shifted; and segments the bottom plane into a plurality of blocks from a center thereof, and shifts each of the pixels of each of the blocks in a direction approximate to the other one of the clockwise direction and the counterclockwise direction according to the displacements of the bottom plane, wherein when the pixels are shifted out of the block and in to an adjacent block, the pixels are turned according to the direction in the adjacent block and are continuously shifted.

18. The three-dimensional panoramic video generating apparatus as claimed in claim 16, wherein when the pixels of the side planes are shifted rightward in the horizontal wraparound manner, the pixels of the top plane are rotated in the counterclockwise direction and the pixels of the bottom plane are rotated in the clockwise direction; when the pixels of the side planes are shifted leftward in the horizontal wraparound manner, the pixels of the top plane are rotated in the clockwise direction and the pixels of the bottom plane are rotated in the counterclockwise direction.

19. The three-dimensional panoramic video generating apparatus as claimed in claim 11, wherein the polyhedral mapping projection is a cube mapping projection.

20. The three-dimensional panoramic video generating apparatus as claimed in claim 11, wherein the parallax calculating module uses a principal component analysis optical flow method to calculate the displacements of the pixels in the side planes.

* * * * *